Patented June 21, 1932

1,863,735

UNITED STATES PATENT OFFICE

JUSTIN F. WAIT, OF NEW YORK, N. Y., ASSIGNOR TO NATIONAL ANILINE & CHEMICAL CO., INC., A CORPORATION OF NEW YORK

PROCESS OF TREATING PHENYLGLYCINE AND PRODUCT THEREOF

No Drawing.    Application filed December 18, 1924.  Serial No. 756,800.

This invention relates to the manufacture of chemical products by a process in which an organic intermediate compound is fused with caustic alkali, and the resulting fusion mixture is introduced into water. It relates specifically to an improved process of treating the fusion mixtures resulting from the fusion of phenylglycine and its salts with caustic alkali.

Processes are well known to the art for the manufacture of chemical products which include the steps of fusing an organic intermediate compound, for example phenylglycine, with caustic alkali, and introducing the resulting fusion mixture into a liquid, as for example water, to form a solution of constituents of the same. The contact of the hot fluid fusion mass with the water often produces objectionable results due to local overheating. These objectionable results have been found present particularly with fusions in which anhydrous caustic alkalies have been used, due to the fact that oxidation or other undesirable side reactions are caused to take place.

According to the present invention an improved result is obtained by solidifying the fusion metal before it is dissolved in the liquid. In carrying out this invention, it is preferable, in order to facilitate rapid solution of the solid in the liquid and in order to provide for rapid dissipation of the heat, to divide the solid into particles having large surface areas in proportion to the mass of the solid. This may be done in a variety of ways as, for example, by making the same in thin sheets or flakes, or by breaking the same up into small particles as by pulverizing or grinding the same. It is also found desirable with certain reactions not only to solidify the fusion mass but also to cool the same considerably below its solidifying temperature prior to its introduction into the solvent.

It has also been found desirable in many instances to carry out the solidifying step with the exclusion of air so as to avoid oxidation or other deleterious results. This may be done by carrying on the process in an airtight vessel or chamber either evacuated or filled with an inert gas.

When it is desired to have the solid particles in the form of flakes the flakes may be conveniently produced, for example, by permitting a smooth cylinder, which may be cooled in any convenient manner, to dip into the molten mass and be slowly revolved, thereby permitting a film to be picked up on the surface of the cylinder. The film will cool and solidify and can then be scraped off as, for example, by means of a doctor or scraper. The fused mass may, however, be permitted to spread out into a thin layer and solidify and the solvent may be caused to pass over the surface thereof and dissolve the same, or, the fused mass upon being solidified may be broken up into particles of convenient size and shape to permit their being readily dissolved.

One of the features of this invention is to prevent local or excessive overheating of the materials and to insure a temperature thereof less than the boiling point of the liquid in which it is dissolved. In some instances it may be desirable to carry out the process by causing solidification and solution of the mass to take place almost simultaneously. This may be done, for example, by slowly introducing the fused mass, say in the form of small drops or fine streams, into a mixture of water and broken ice so that the fused particles become solidified almost instantly and prior to any appreciable amount of the same becoming dissolved. Also in this way all danger of local overheating of the particles is obviated. This result may also sometimes be obtained by having the water near 0° C. and keeping the same cooled by means of a cooling coil. A temperature below 5° C. has been found to be satisfactory.

The following is given as a specific example illustrating how the process may be carried out. I do not intend, however, to limit myself to the particular materials or conditions mentioned.

About 8 parts of phenylglycine or phenylglycine salt are mixed with about 50 parts of equal quantities of sodium and potassium hydroxides and 5 parts of sodamide, or other suitable additional dehydrating agent (that is, a dehydrating agent in addition to the sodium and potassium hydroxides), while maintaining the temperature sufficiently high to cause the mixture to fuse. The fused mass is then placed in a vessel into which a revolving drum dips and films are formed on the surface of the revolving drum, permitted to solidify by cooling below 200° C., and are then scraped off in the well known manner. The product obtained is in the form of flakes and comprises a mixture of indoxyl, an alkali metal carbonate, and an alkali metal hydroxide. The flakes of solidified material may then be introduced into water and be permitted to dissolve. During the fusing and flaking operation the product will preferably be protected from the oxidizing action of the air by enclosing the same in an air-tight vessel containing ammonia or other inert gas.

I claim:

1. In a process which comprises fusing a phenylglycine compound with caustic alkali in the presence of an additional dehydrating agent and dissolving the fusion mass in water, the improvement which comprises cooling the fusion mass in a sub-divided condition below its solidification temperature, prior to dissolving the same in water.

2. In a process which comprises fusing a salt of phenylglycine with caustic alkali in the presence of an additional dehydrating agent and dissolving the fusion mass in water, the improvement which comprises solidifying the fusion mass so that it has large surface areas compared to its volume, prior to dissolving the same in water.

3. In a process which comprises fusing a phenylglycine compound with caustic alkali in the presence of sodamide and dissolving the fusion mass in water, the improvement which comprises cooling the fusion mass in a subdivided condition below 200° C., prior to dissolving the same in water.

4. In a process which comprises fusing a salt of phenylglycine with caustic alkali in the presence of an additional dehydrating agent and dissolving the fusion mass in water, the improvement which comprises cooling the fusion mass below its solidification temperature and forming the same into flakes, prior to dissolving the same in water.

5. In a process which comprises fusing a salt of phenylglycine with caustic alkali in the presence of an additional dehydrating agent and dissolving the fused mass in water, the improvement which comprises introducing the mass in a subdivided condition into water containing ice.

6. In a process which comprises fusing a salt of phenylglycine with caustic alkali in the presence of an additional dehydrating agent and dissolving the fused mass in water, the improvement which comprises introducing the mass in a sub-divided condition into water maintained at a temperature below 5° C.

7. In a process which comprises fusing a salt of phenylglycine with caustic alkali in the presence of sodamide and dissolving the fusion mass in water, the improvement which comprises solidifying the fusion mass so that it has large surface areas compared to its volume, and introducing the resulting solid into water maintained at a temperature below 5° C.

8. In a process which comprises fusing a salt of phenylglycine with caustic alkali in the presence of an additional dehydrating agent and dissolving the fusion mass in water, the improvement which comprises cooling the fusion mass in a subdivided condition below its solidification temperature, prior to dissolving the same in water, while excluding air.

9. In a process which comprises fusing a salt of phenylglycine with caustic alkali in the presence of sodamide and dissolving the fusion mass in water, the improvement which comprises cooling the fusion mass below its solidification temperature and forming the same into flakes, prior to dissolving the same in water, while excluding air by means of an inert atmosphere.

10. A product in the form of flakes comprising a mixture of indoxyl, an alkali metal carbonate, and an alkali metal hydroxide.

In testimony whereof I affix my signature.

JUSTIN F. WAIT.